(12) United States Patent
Matsumura et al.

(10) Patent No.: US 11,926,721 B2
(45) Date of Patent: Mar. 12, 2024

(54) SILICONE RUBBER MOLDED ARTICLE AND METHOD FOR MANUFACTURING SAME

(71) Applicant: Fuji Polymer Industries Co., Ltd., Nagoya (JP)

(72) Inventors: Tomoki Matsumura, Aichi (JP); Keisuke Kawahama, Aichi (JP); Makoto Iwai, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 0 days.

(21) Appl. No.: 18/254,077

(22) PCT Filed: Jan. 13, 2022

(86) PCT No.: PCT/JP2022/000811
§ 371 (c)(1),
(2) Date: May 23, 2023

(87) PCT Pub. No.: WO2022/168552
PCT Pub. Date: Aug. 11, 2022

(65) Prior Publication Data
US 2024/0002619 A1    Jan. 4, 2024

(30) Foreign Application Priority Data

Feb. 3, 2021   (JP) ................................ 2021-015867
Mar. 18, 2021  (JP) ................................ 2021-044618
Oct. 26, 2021  (WO) .................. PCT/JP2021/039489

(51) Int. Cl.
*B32B 3/00*       (2006.01)
*C08J 7/044*      (2020.01)

(52) U.S. Cl.
CPC ........... *C08J 7/044* (2020.01); *C08J 2383/04* (2013.01)

(58) Field of Classification Search
CPC ....................................................... C08J 7/044
See application file for complete search history.

(56) References Cited

U.S. PATENT DOCUMENTS 5,336,442 A    8/1994   Kuramochi
5,587,110 A    12/1996  Yamana et al.
(Continued)

FOREIGN PATENT DOCUMENTS

EP    0 496 056    7/1992
GB    2 253 856    9/1992
(Continued)

OTHER PUBLICATIONS

International Search Report issued in International Application No. PCT/JP2022/000811, dated Mar. 29, 2022, 3 pages.

*Primary Examiner* — Elizabeth E Mulvaney
(74) *Attorney, Agent, or Firm* — Hamre, Schumann, Mueller & Larson, P.C.

(57) ABSTRACT

Provided is a silicone rubber molded body (1) including a conductive ink coating layer (3) that is disposed on a portion of the surface of the silicone rubber molded body (1). The conductive ink coating layer (3) contains a hydrolyzable organosilicon compound. Using the silicone rubber molded body with a saturated water absorption of 0.10 to 1.50% by mass and/or using a conductive ink containing water improves the affinity between the surface of the silicone rubber molded body (1) and the conductive ink coating layer (3). A residual ink area is an average of 20% or more and 100% or less after the conductive ink coating layer (3) is subjected to an abrasion test. With this configuration, the silicone rubber molded body has a high affinity between the silicone rubber and the conductive ink, good durability under continuous stress, and stability in long-term use. Further provided is a method for producing the silicone rubber molded body.

20 Claims, 2 Drawing Sheets

(56) References Cited

U.S. PATENT DOCUMENTS

| | | |
|---|---|---|
| 5,895,711 A | 4/1999 | Yamaki et al. |
| 5,925,893 A | 7/1999 | Ishii et al. |
| 6,180,176 B1 | 1/2001 | Gledhill et al. |
| 6,451,437 B1 | 9/2002 | Amidaiji et al. |
| 2001/0018473 A1 | 8/2001 | Otomo et al. |
| 2014/0060903 A1 | 3/2014 | Hamada et al. |
| 2020/0284744 A1 | 9/2020 | Naito et al. |
| 2021/0373473 A1 | 12/2021 | Lee et al. |

FOREIGN PATENT DOCUMENTS

| | | |
|---|---|---|
| JP | 45-011440 | 4/1970 |
| JP | 62-011738 | 1/1987 |
| JP | 4-198364 | 7/1992 |
| JP | 4-292670 | 10/1992 |
| JP | 6-100818 | 4/1994 |
| JP | 7-149448 | 6/1995 |
| JP | 7-258548 | 10/1995 |
| JP | 10-142987 | 5/1998 |
| JP | 10-175264 | 6/1998 |
| JP | 2000-043198 | 2/2000 |
| JP | 2001-056618 | 2/2001 |
| JP | 2001-139816 | 5/2001 |
| JP | 2001-214101 | 8/2001 |
| JP | 2005-008792 | 1/2005 |
| JP | 2005-036154 | 2/2005 |
| JP | 2005-075970 | 3/2005 |
| JP | 2005-297234 | 10/2005 |
| JP | 2012-084294 | 4/2012 |
| JP | 2014-063989 | 4/2014 |
| JP | 2014-125598 | 7/2014 |
| JP | 2016-100092 | 5/2016 |
| JP | 2017-117861 | 6/2017 |
| JP | 2019-091627 | 6/2019 |
| JP | 2020-143956 | 9/2020 |
| WO | 2017/033960 | 3/2017 |
| WO | 2020/096699 | 5/2020 |

SILICONE RUBBER MOLDED ARTICLE AND METHOD FOR MANUFACTURING SAME

TECHNICAL FIELD

The present invention relates to a silicone rubber molded body with a conductive ink being applied to and cured on the surface, which is used for, e.g., switching functional devices, flexible electrical circuits, or electrical contacts. The present invention also relates to a method for producing the silicone rubber molded body.

BACKGROUND ART

A liquid silicone composition contains a curable polyorganosiloxane as abase polymer and is diluted with a solvent. Conventionally, the liquid silicone composition has been widely wed in a variety of applications, including painting and marking, due to its excellent properties such as heat resistance and weather resistance. In particular, the liquid silicone composition also is given conductive properties by incorporating conductive carbon black. Because of these properties, the conductive liquid silicone composition is used for switching functional devices, flexible electrical circuits, etc.

Patent Document 1 proposes a method for producing a conductive ink. The method includes: (i) blending a polyorganosiloxane with carbon black, the polyorganosiloxane containing an alkenyl group bonded to a reactive group at the end; (ii) kneading the mixture uniformly to prepare a base compound; and (iii) adding a solvent to the base compound. Patent Document 2 proposes the use of a conductive ink to form an electrical circuit on the surface of an electrical insulating sheet such as silicone rubber. Patent Document 3 proposes a capacitive touch switch composed of silicone rubber. In the capacitive touch switch, at least a perforated portion of a conductive member is a printed body that is formed by using a conductive ink. Patent Document 4 proposes a heat fixing roll coated with a cured film. The cured film contains the following: a hydrolytic condensate of colloidal silica and a specific silicon compound; and a linear dialkylpolysiloxane diol.

PRIOR ART DOCUMENTS

Patent Documents

Patent Document 1: JP 2005-075970 A
Patent Document 2: JP 2012-084294 A
Patent Document 3: JP 2016-100092 A
Patent Document 4: JP H10(1998)-142987 A

DISCLOSURE OF INVENTION

Problem to be Solved by the Invention

However, the conventional silicone rubber molded bodies have problems of a low affinity between the silicone rubber and the conductive ink and poor durability under continuous stress. For example, in Patent Document 4, the linear dialkylpolysiloxane diol is used to impart releasability to the cured film, but may reduce the affinity between the silicone rubber and the conductive ink.

To solve the above conventional problems, the present invention provides a silicone rubber molded body that has a high affinity between silicone rubber and a conductive ink, good durability under continuous stress, and stability in long-term use, and a method for producing the silicone rubber molded body.

Means for Solving Problem

A silicone rubber molded body of the present invention includes a conductive ink coating layer that is disposed on a portion of a surface of the silicone rubber molded body. The silicone rubber molded body is at least one molded body selected from the group consisting of a millable silicone rubber molded body and an addition curable silicone rubber molded body, and contains no linear dialkylpolysiloxane diol. The conductive ink coating layer contains a hydrolyzable organosilicon compound. At least one selected from the group consisting of (i) using the silicone rubber molded body with a saturated water absorption of 0.10 to 1.50% by mass and (ii) using a conductive ink containing water improves an affinity between the surface of the silicone rubber molded body and the conductive ink coating layer. A residual ink area is an average of 20% or more and 100% or less when a surface of the conductive ink coating layer is subjected to an abrasion test in accordance with JIS L 1096 8.19.3, C method (Taber-type method).

A first method for producing the silicone rubber molded body of the present invention includes using the silicone rubber molded body with a saturated water absorption of 0.10 to 1.50% by mass, and applying a conductive ink containing a hydrolyzable organosilicon compound to a portion of a surface of the silicone rubber molded body to form a conductive ink coating layer. A residual ink area is an average of 20% or more and 100% or less when a surface of the conductive ink coating layer is subjected to an abrasion test in accordance with JIS L 1096 8.19.3, C method (Taber-type method).

A second method for producing the silicone rubber molded body of the present invention includes applying a conductive ink containing a hydrolyzable organosilicon compound and water to a portion of a surface of the silicone rubber molded body to form a conductive ink coating layer. A residual ink area is an average of 20% or more and 100% or less when a surface of the conductive ink coating layer is subjected to an abrasion test in accordance with JIS L 1096 8.19.3, C method (Taber-type method).

Effects of the Invention

The silicone rubber molded body of the present invention includes the conductive ink coating layer that is disposed on any portion of the surface. The affinity between the surface of the silicone rubber molded body and the conductive ink coating layer is improved. Moreover, the residual ink area is an average of 20% or more and 100% or less when the surface of the conductive ink coating layer is subjected to the abrasion test. With this configuration, the silicone rubber molded body can have a high affinity between the silicone rubber and the conductive ink, good durability under continuous stress, and stability in long-term use. The first and second production methods of the present invention are able to produce the silicone rubber molded body of the present invention in an efficient and reasonable manner.

DESCRIPTION OF THE INVENTION

Figure 1A:
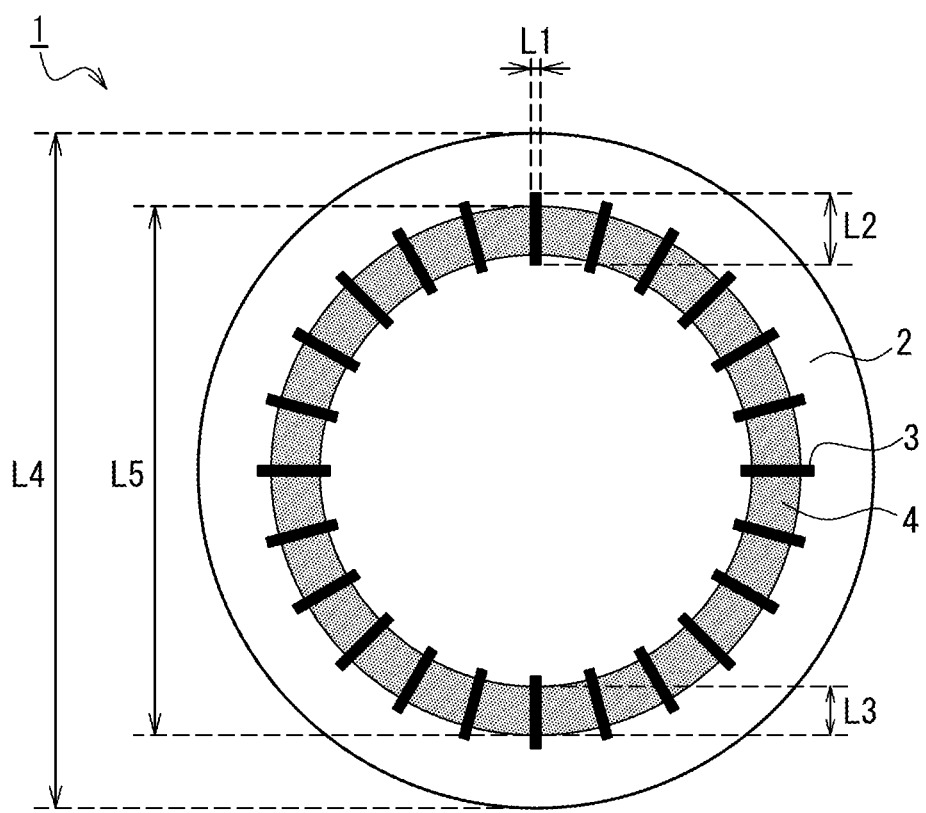
FIG. 1A is a schematic plan view of a silicone rubber molded body in an abrasion test to measure a residual ink area in an example of the present invention

A silicone rubber molded body of the present invention includes a conductive ink coating layer that is disposed on a portion of the surface of the silicone rubber molded body. The silicone rubber molded body is at least one molded body selected from a minable silicone rubber molded body and an addition curable silicone rubber molded body, and contains no linear dialkylpolysiloxane diol. The presence of a linear dialkylpolysiloxane diol in the silicone rubber molded body would improve the releasability, but reduce the affinity for a conductive ink. The conductive ink coating layer contains a hydrolyzable organosilicon compound.

In the present invention, the affinity between the silicone rubber and the conductive ink is improved by using the silicone rubber molded body with a saturated water absorption of 0.10 to 1.50% by mass and/or by using a conductive ink containing water. The saturated water absorption of the silicone rubber molded body is preferably 0.15 to 1.40% by mass. Commercially available silicone rubber materials may be used to obtain the silicone rubber molded body with a saturated water absorption in the above range. The commercially available silicone rubber materials include, e.g., millable silicone rubber materials such as "RBB6650-50BASE", "RBB2004-50BASE", "RBB2070-50BASE", and "SE1185U" manufactured by Dow Toray Co., Ltd.

The amount of water contained in the conductive ink is preferably 0.1 to 3.5 mol %, more preferably 0.3 to 3.3 mol %, and further preferably 0.6 to 3.1 mol % with respect to the organosilicon compound contained in the conductive ink. This allows the residual ink area to reach an average of 20% or more and 100% or less, preferably an average of 25% or more and 95% or less, and more preferably an average of 25% or more and 90% or less when the surface of the conductive ink coating layer is subjected to the abrasion test. Thus, the durability under continuous stress can be improved. The residual ink area is measured in accordance with JIS L 1096 8.19.3, C method (Taber-type method).

A residual monomer ratio of the hydrolyzable organosilicon compound of the conductive ink coating layer is preferably 45 to 95%, and more preferably 50 to 90% by the presence of water in the conductive ink, assuming that a residual monomer ratio of the hydrolyzable organosilicon compound is 100% when no water has been added to a conductive ink. The rate of hydrolysis of the organosilicon compound in the conductive ink is measured from the relative intensities of the peaks of organosilicon monomers observed by $^{29}$S—NMR with respect to the reference peak intensity (100%) of a sample without the addition of $H_2O$.

The surface tackiness of the silicone rubber molded body is determined by an adhesive force that is measured in accordance with JIS Z 0237 under the conditions of contact speed: 2 mm/s, contact load: 100 gf contact time: 5 s, pulling speed: 2 mm/s, and probe diameter: 5 mm. The measured adhesive force is preferably 1.5 to 3.0 gfs, and more preferably 1.6 to 2.5 gfs. The silicon rubber molded body with this surface tackiness can achieve better durability under continuous stress and long-term stability.

The silicone rubber molded body of the present invention is at least one molded body selected from a millable silicone rubber molded body that is cured with an organic peroxide and an addition curable silicone rubber molded body. A minable silicone rubber material preferably has the following composition:
- (A) 100 parts by mass of an organopolysiloxane represented by $R^1{}_a SiO_{(4-a)2}$ (where $R^1$ represents the same or different substituted or unsubstituted monovalent hydrocarbon groups, and a represents a positive number of 1.95 to 2.05);
- (B) 5 to 100 parts by mass of a filler such as reinforcing silica with a specific surface area of 50 $m^2$/g or more measured by a BET adsorption method; and
- (C) an effective amount of organic peroxide.

Examples of the organic peroxide include benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(tert-butylperoxy)hexane, di-tert-butyl peroxide, tert-butyl perbenzoate, and 1,6-hexanediol-bis-tert-butylperoxycarbonate. The amount of the organic peroxide added is preferably 0.1 to 15 parts by mass, and particularly preferably 0.2 to 10 parts by mass with respect to 100 parts by mass of the millable silicone rubber component. If the amount of the organic peroxide is too small, the crosslinking reaction does not proceed sufficiently, which may lead to poor physical properties such as a decrease in hardness, a lack of rubber strength, and an increase in compression set. If the amount of the organic peroxide is too large, many degradation products of a curing agent are generated, which may lead to poor physical properties such as an increase in compression set or may cause significant discoloration of the resulting sheet. In this case, commercially available products may be used as the millable silicone rubber material.

Millable silicone rubber is superior to addition reaction silicone rubber and condensation silicone rubber in, e.g., rubber strength, stretching durability, heat resistance, and weather resistance. By utilizing these advantages, the minable silicone rubber has been widely used as a rubber molded body. In particular, a conductive filler-containing ink is applied to and cured on the surface of the millable silicone rubber molded body to form a conductive silicone rubber molded body, which is used for, e.g., switching devices and electrical circuits. In the conventional silicone rubber molded body coated with the conductive filler-containing ink, poor adhesion durability of the conductive filler-containing ink has often been a problem. The present inventors addressed the problem and found that the adhesion durability of the conductive filler-containing ink to the silicone rubber can be associated with the water absorption of the silicone rubber, the residual monomer ratio of the organosilicon compound in the conductive filler-containing ink, and the adhesion properties of the silicone rubber. In addition, the present invention is also useful for addition reaction type liquid silicone rubber.

A minable silicone rubber composition further may contain additives. Examples of the additives include the following: fillers such as thy or wet silica, surface-treated thy or wet silica, talc, clay, mica, calcium carbonate, aluminum hydroxide, alumina, and glass fiber; cerium compounds such as cerium oxide, cerium hydroxide, and cerium octoate; iron oxides such as iron sesquioxide and iron octoate; heat resistance improvers such as titanium dioxide; and flame retardant auxiliaries such as an azo compound, triiron tetroxide, and a platinum compound. The minable silicone rubber composition may be kneaded with a rubber mixer such as a kneader or two rolls, and then molded and cured by a conventional method such as pressure molding, extrusion molding, injection molding, or calender molding.

The addition curable silicone rubber molded body may be made of a liquid silicone rubber material. In this case, commercially available products may be used as the liquid silicone rubber material. The addition curable liquid silicone rubber material preferably has the following composition:

(A) Base polymer component: an organopolysiloxane containing an average of one or more silicon-bonded alkenyl groups per molecule;

(B) Crosslinking component: an organopolysiloxane containing an average of one or more silicon-bonded hydrogen atoms per molecule, in which the number of moles of the organopolysiloxane is 0.01 to 3 moles with respect to 1 mole of the silicon-bonded alkenyl groups in the component A;

(C) Catalyst component: a platinum group metal catalyst at a concentration of 0.01 to 1000 ppm based on the weight of metal atoms with respect to the component A; and (D) A filler such as reinforcing silica with a specific surface area of 50 $m^2/g$ or more measured by a BET adsorption method, in which the amount of the filler is 5 to 100 parts by mass with respect to 100 parts by mass of the base polymer component.

A commercially available product is composed of a solution A and a solution B. The solution A contains the base polymer component and the catalyst component. The solution B contains the base polymer component and the crosslinking component. The solution A and the solution B, and optionally the other components, are mixed before use, and the mixture is molded and then cured.

The composition of the present invention may include components other than the above as needed. For example, a heat resistance improver (such as colcothar, titanium oxide, or cerium oxide), a flame retardant auxiliary, and a curing retarder may be added. Moreover, an organic or inorganic particle pigment may be added for the purpose of coloring and toning. Alkoxy group-containing silicone may be added as a material used for, e.g., the surface treatment of a filler. An organopolysiloxane having no addition curing reactive group may also be added. The viscosity of the organopolysiloxane is preferably 10 to 100,000 mPa·s, and particularly preferably 100 to 10,000 mPa·s at 25° C. in terms of workability.

The contact resistance value of the conductive ink coating layer is 300Ω or less, more preferably 10 to 200Ω, and further preferably 10 to 100Ω. This can ensure suitable electrical continuity. The conductive ink contains a conductive filler. Examples of the conductive filler include the following: carbon-based materials such as carbon black, graphite, graphene, carbon nanotube, and carbon fiber; metal materials such as silver, copper, aluminum, nickel, tin, and silver-plated copper powder; metal oxide materials such as tin oxide powder, indium oxide powder, zinc oxide powder, and potassium titanate powder; materials coated with metal or metal oxide such as surface plated glass beads or mica powder and plated glass fibers or carbon fibers.

The conductive ink contains the conductive filler and the hydrolyzable organosilicon compound. The conductive filler may be a known material such as carbon black. The amount of the conductive filler added is preferably 5 to 30% by mass with respect to 100% by mass of the conductive ink. The hydrolyzable organosilicon compound may be a known material such as methyl silicate, ethyl silicate, propyl silicate, methyltrimethoxysilane, methyltriethoxysilane, methyltripropoxysilane, tetramethoxysilane, tetraethoxysilane, tetrapropoxysilane, vinyltrimethoxysilane, vinyltriethoxysilane, vinyltripropoxysilane, methyltris(methoxyethoxy)silane, vinyltris(methoxyethoxy)silane, methyltripropenoxysilane, vinyltripropenoxysilane, methyltriacetoxysilane, vinyltriacetoxysilane, methyltris(acetoxime)silane, vinyltris(acetoxime)silane, methyltris(methylethylketoxime)silane, or vinyltris(methylethylketoxime)silane. The amount of the hydrolyzable organosilicon compound added is preferably 5 to 30% by mass with respect to 100% by mass of the conductive ink. Examples of a solvent include hydrocarbon solvents such as toluene, xylene, cyclohexane, n-hexane, n-heptane, n-octane, nonane, naphtha, mineral spirits, and petroleum benzine. These solvents may be used alone or in combinations of two or more. In this case, commercially available products may be used as the conductive ink. The present invention does not include acidic colloidal silica. The use of the acidic colloidal silica may reduce electrical conductivity, and thus is not preferred.

Figure 1B:
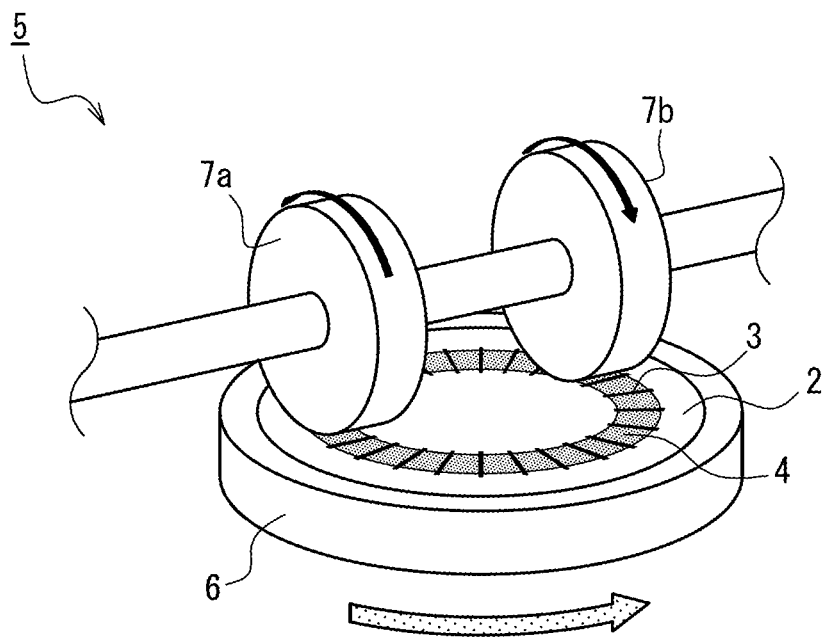
FIG. 1B is a schematic perspective view of an abrasion tester.

Hereinafter, the present invention will be described with reference to the drawings. In the following drawings, the same components are denoted by the same reference numerals. FIG. 1A is a schematic plan view of a silicone rubber molded body 1 in an abrasion test to measure a residual ink area in an example of the present invention FIG. 1B is a schematic perspective view of an abrasion tester 5 for the abrasion test. The abrasion test conforms to JIS L 1096 and uses a Taber abrader to measure a residual ink area. The silicone rubber molded body 1 is in the form of a sheet 2 with a diameter L4 of 120 mm and a thickness of 2 mm. A conductive ink is applied to the surface of the sheet 2 and cured by heating. A conductive ink coating portion 3 after curing has a width L1 of 4 mm and a length L2 of 15 mm, as illustrated in FIG. 1A. A plurality of conductive ink coating portions 3 are circumferentially spaced from each other to form an annular shape.

In the abrasion tester 5, the silicone rubber molded body 1 is placed on a rotating table 6 and rotated in the direction of the arrow shown in FIG. 1B (where the rotational speed of the rotating table 6 is 70 rpm). Friction wheels 7a, 7b are arranged on the silicone rubber molded body 1 and rotated in opposite directions to each other, as indicated by the arrows shown in FIG. 1B. The total load of the friction wheels 7a, 7b is 250 gf. The rotational speed of each friction wheel is 70 rpm. Abrasion powder is sucked away during the rotation. The contact portion 4 of the friction wheels with the silicone rubber molded body 1 is annular in shape and has an outer diameter L5 of about 88 mm and a width L3 of about 10 mm.

EXAMPLES

Hereinafter, the present invention will be described by way of examples. However, the present invention is not limited to the following examples.

<Residual Ink Area>

The residual ink area was measured in accordance with JIS L 1096 using a Taber abrader manufactured by Toyo Seiki Seisaku-sho, Ltd.

Silicone rubber: A sheet with a thickness of 2 mm was used.

Conductive ink: A conductive ink was applied to the surface of the sheet and cured by heating at 200° C. for 30 minutes, so that a plurality of conductive ink coating portions, each having a width L1 of 4 mm and a length L2 of 15 mm, were arranged in an annular fashion, as illustrated in FIGS. 1A to 1B.

Test conditions: The friction wheels (sandpaper #320) were rotated 300 times at a rotational speed of 70 rpm and a total load of 250 gf. The proportion of the conductive ink coating portions remaining on the surface of the sheet after having been subjected to the abrasion test was represented by a black and white image through binarization and expressed in area percentage. The abrasion test was performed three times, and the average of the resulting values was determined as a residual ink area.

<Saturated Water Absorption>

Silicone rubber samples with a length of 50 mm, a width of 50 mm, and a height of 2 mm were stored at a temperature of 30° C. and a relative humidity of 60% RH. The samples were taken out after 24 hours and 96 hours, respectively. Then, the weight of each sample was measured at a temperature of 25° C. and a relative humidity of 25% RH. The difference in weight change between the sample after 24 hours and the sample after 96 hours was 0.01% or less. Therefore, the rate of increase in the weight of the sample after 96 hours was determined as a saturated water absorption <Adhesive Force>

The adhesive force of a silicone rubber sample was measured using a tackiness tester TAC 1000 (which conforms to JIS Z 0237 and is manufactured by RHESCA CO., LTD.) under the conditions of contact speed: 2 mm/s, contact load: 100 gf, contact time: 5 s, pulling speed: 2 mm/s, probe diameter: 5 mm, measurement temperature: room temperature, and n=3.

The silicone rubber sample before the application of the conductive ink was used to measure the adhesive force of the molded body.

<Amount of Water Contained in Ink>

A predetermined amount of ion-exchanged water was added to the conductive ink and mixed together at room temperature. After 24 hours, the conducive ink was measured by NMR and applied to a sample. The number of moles of the organosilicon compound contained in the conductive ink was calculated from its molecular weight and concentration. The amounts of the ion-exchanged water added were, respectively, 0.75, 1.50, 2.25, and 3.0 times as much as the number of moles of the organosilicon compound.

<Residual Monomer Ratio after Hydrolysis of Hydrolyzable Organosilicon Compound in Conductive Ink>

The rate of hydrolysis was measured from the relative intensities of the peaks of organosilicon monomers observed by $^{29}Si$—NMR with respect to the reference peak intensity (100%) of a sample without the addition of $H_2O$. Table 1 shows the results, as indicated by "residual monomer ratio in ink."

<Contact Resistance Value of Conductive Ink Coating Layer>

Figure 2:
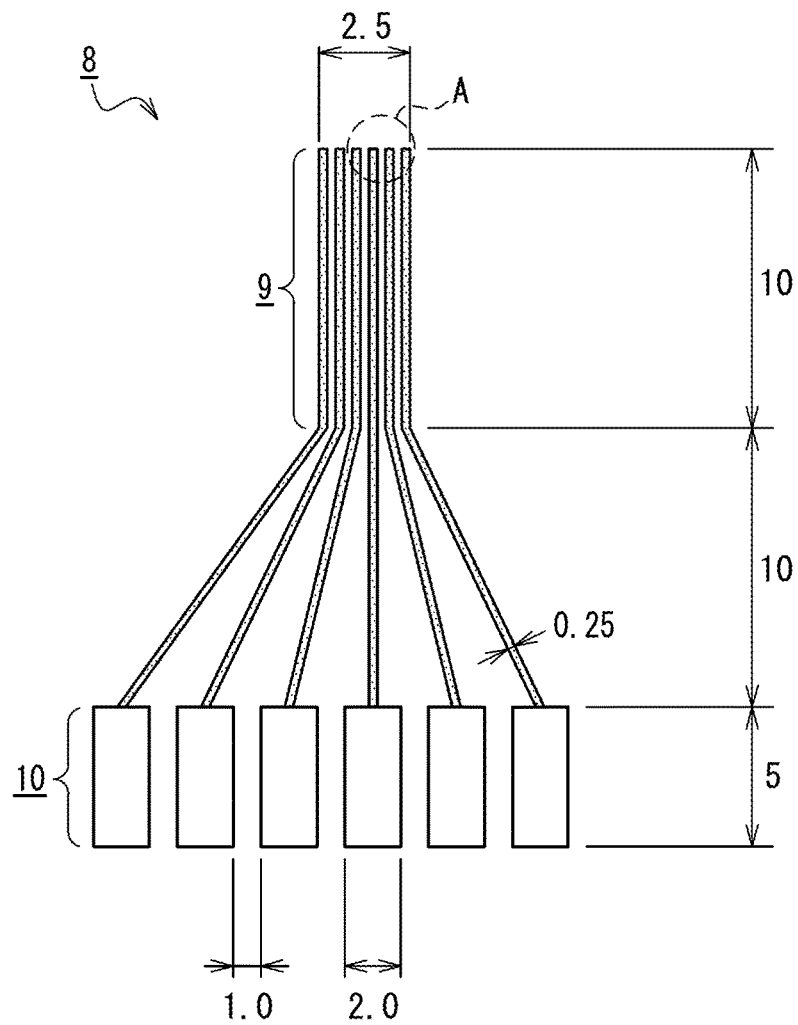
FIG. 2 is a schematic plan view of a comb-shaped electrode used in the measurement of a contact resistance value of a conductive ink coating layer in an example of the present invention.
Figure 2:
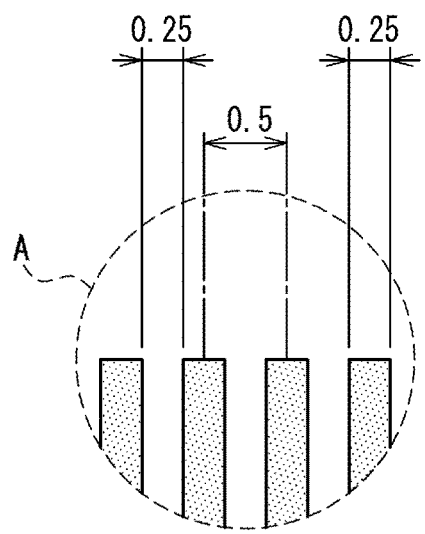

FIG. 2 illustrates a comb-shaped electrode 8 (a portion represented by A is an enlarged view). The comb-shaped electrode 8 had a line width of 0.25 mm, a pitch between electrodes of 0.5 mm, and an electrode thickness of 18 µm. A contact resistance measuring portion 9 had a length of 10 mm and a width of 2.5 mm. Clip leads were connected to the corresponding clip lead connecting electrodes 10. Using a resistance meter (3540 mΩ HiTESTER manufactured by MOM E.E. CORPORATION, range: 300Ω, measurement current 1 mA) in a DC four-terminal method, a sample was held under a load of 100 N so that the conductive ink coating layer was brought into contact with the comb-shaped portion of the contact resistance measuring portion 9, and electrical resistance was measured after 60 seconds. In FIG. 2, the numerical values represent dimensions (unit: mm).

Examples 1 to 11, Comparative Examples 1 to 2

[Production Method of Silicone Rubber]

First, 300 g of a commercially available silicone base polymer was mixed with 2.1 g of a vulcanizing agent (peroxide silicone masterbatch, RC4-50P (manufactured by Dow Toray Co., Ltd., 2,5-dimethyl-2,5-di(tert-butylperoxy) hexane, 50% silicone oil)), and the mixture was kneaded with two rolls. Next, the mixture was subjected to primary vulcanization using a press at 170° C. for 10 minutes, and subsequently subjected to secondary vulcanization using a circulating hot air oven at 200° C. for 4 hours.

Each silicone base polymer is as follows.

RBB6650-50BASE: minable silicone rubber material manufactured by Dow Toray Co., Ltd.

RBB2004-50BASE: minable silicone rubber material manufactured by Dow Toray Co., Ltd.

RBB2070-50BASE: millable silicone rubber material manufactured by Dow Toray Co., Ltd.

SE1185U: millable silicone rubber material manufactured by Dow Toray Co., Ltd.

[Application of Conductive Ink]

First, 40 g of a commercially available conductive ink (PRK-3C manufactured by Dow Toray Co., Ltd.) was mixed with 310 mL of a solvent (hydrocarbon solvent: Solvent S). In Examples 6 to 9 and 11, ion-exchanged water was added to the conductive ink in an amount as shown in Table 1. The conductive ink thus prepared was applied to the surface of silicone rubber so that each conductive ink coating portion had a length of 15 mm and a width of 2 mm, as illustrated in FIG. 1, and the amount of ink after drying was 0.1 g. The conductive ink was dried and baked in a circulating hot air oven at 200° C. for 30 minutes.

Table 1 shows the conditions and the results.

TABLE 1

| | Ex. 1 | Ex. 2 | Ex. 3 | Ex. 4 | Comp. Ex. 1 | Comp. Ex. 2 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| RBB6650-50BASE | 100 | 50 | 25 | 10 | — | — | — | — | — | — | — | 75 | 75 |
| RBB2004-50BASE | — | 50 | 75 | 90 | — | — | 100 | 100 | 100 | 100 | 100 | 25 | 25 |
| RBB2070-50BASE | — | — | — | — | 100 | — | — | — | — | — | — | — | — |
| SE1185U | — | — | — | — | — | 100 | — | — | — | — | — | — | — |
| RC-4-50P | 0.7 | 0.7 | 0.7 | 0.7 | 0.7 | 0.7 | 0.7 | 0.7 | 0.7 | 0.7 | 0.7 | 0.7 | 0.7 |
| Saturated water absorption (%) | 1.27 | 0.67 | 0.38 | 0.19 | 0.05 | 0.08 | 0.08 | 0.08 | 0.08 | 0.08 | 0.08 | 0.99 | 0.99 |
| Amount of $H_2O$ added to ink (eq-mol) | none | none | none | none | none | none | none | 0.75 | 1.50 | 2.25 | 3.00 | none | 0.75 |
| Residual monomer ratio in ink (%) | 100 | 100 | 100 | 100 | 100 | 100 | 100 | 87 | 76 | 63 | 52 | 100 | 87 |
| Adhesive force (gf · s) | 1.8 | 2.4 | 1.8 | 1.6 | 1.4 | 2.1 | 2.5 | 2.5 | 2.5 | 2.5 | 2.5 | 2.4 | 2.4 |

TABLE 1-continued

|  | Ex. 1 | Ex. 2 | Ex. 3 | Ex. 4 | Comp. Ex. 1 | Comp. Ex. 2 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Residual ink area (%) | 61 | 84 | 57 | 46 | 9 | 4 | 29 | 38 | 48 | 42 | 29 | 28 | 56 |
| Contact resistance value of ink coating layer (Ω) | 78 | 32 | 150 | 85 | 184 | 143 | 283 | 185 | 163 | 85 | 63 | 95 | 41 |

Table 1 reveals the following.

(1) The saturated water absorption of the silicone rubber in Examples 1 to 4 and 10 are higher than that of the silicone rubber in Comparative Examples 1 to 2. Thus, Examples 1 to 4 and 10 can improve the affinity between the silicone rubber and the conductive ink, and can also increase both the ink adhesion and the residual ink area (2) In Examples 5 to 9, although the saturated moisture content of the silicone rubber is outside the range of 0.10 to 1.50, a predetermined amount of water is contained in the conductive ink, and thus the residual monomer ratio after hydrolysis of the organosilicon compound in the conductive ink is 52 to 87%. Consequently, Examples 5 to 9 can improve the affinity between the silicone rubber and the conductive ink, can increase both the ink adhesion and the residual ink area, and further can enhance the abrasion resistance.

(3) In Example 11, the saturated water absorption of the silicone rubber is increased, and the residual monomer ratio after hydrolysis of the organosilicon compound in the conductive ink is 87%. Consequently, Example 11 can improve the affinity between the silicone rubber and the conductive ink, and can also increase both the ink adhesion and the residual ink area (4) In the present invention, the content of the hydrolyzable organosilicon compound in the conductive ink is important, and other components may be used optionally. Table 1 shows the residual monomer ratio in the conductive ink measured by $^{29}$Si—NMR, (i.e., the results of analysis of changes in the content of the organosilicon compound before and after hydrolysis). It is confirmed that the adhesion durability of the conductive filler-containing ink to the silicone rubber can be improved when the residual monomer ratio of the hydrolyzable organasilicon compound of the conductive ink coating layer is 50% or more.

Examples 12 to 14, Comparative Example 3

[Production Method of Silicone Rubber]

Commercially available addition curable liquid silicone polymers RBL9200-50A and RBL9200-50B were used (manufactured by Dow Toray Co., Ltd., liquid silicone rubber materials, each of which is composed of a solution A and a solution B: the solution A containing a base polymer component and a catalyst component, and the solution B containing a base polymer component and a crosslinking component). These liquid silicone polymers were weighed to 50 g each and mixed. The mixture was subjected to vacuum defoaming, followed by primary vulcanization using a press at 150° C. for 10 minutes.

[Application of Conductive Ink]

First, 40 g of a commercially available conductive ink (PRK-3C manufactured by Dow Toray Co., Ltd.) was mixed with 310 mL of a solvent (hydrocarbon solvent: Solvent S). Then, ion-exchanged water was added to the conductive ink in an amount as shown in Table 2. The conductive ink thus prepared was applied to the surface of silicone rubber so that each conductive ink coating portion had a length of 15 mm and a width of 2 mm, as illustrated in FIG. 1, and the amount of ink after drying was 0.1 g. Next, the conductive ink was dried and baked, while the silicone rubber was subjected to secondary vulcanization using a circulating hot air oven at 200° C. for 2 hours.

Table 2 shows the conditions and the results.

TABLE 2

|  | Ex. 12 | Ex. 13 | Ex. 14 | Comp. Ex. 3 |
|---|---|---|---|---|
| RBL9200-50A | 50 | 50 | 50 | 50 |
| RBL9200-50B | 50 | 50 | 50 | 50 |
| Saturated water absorption (%) | 0.03 | 0.03 | 0.03 | 0.03 |
| Amount of H$_2$O added to ink (eq-mol) | 1.50 | 2.25 | 3.00 | none |
| Residual monomer ratio in ink (%) | 76 | 63 | 52 | 100 |
| Adhesive force (gf · s) | 1.6 | 1.6 | 1.6 | 1.6 |
| Residual ink area (%) | 34 | 46 | 37 | 12 |
| Contact resistance value of ink coating layer (Ω) | 142 | 96 | 293 | 118 |

Table 2 reveals the following.

(1) In Examples 12 to 14, a predetermined amount of water is added to the conductive ink, and thus the residual monomer ratio after hydrolysis of the organosilicon compound in the conductive ink is 52 to 76%. Consequently, Examples 12 to 14 can improve the affinity between the silicone rubber and the conductive ink, and can also increase the residual ink area.

(2) In Comparative Example 3, a predetermined amount of water is not added to the conductive ink, and the residual monomer ratio of the organosilicon compound in the conductive ink is 100%. This results in a low affinity between the silicone rubber and the conductive ink, and reduces the residual ink area.

INDUSTRIAL APPLICABILITY

The silicone rubber molded body of the present invention is suitable for, e.g., switching functional devices, flexible electrical circuits, or electrical contacts.

DESCRIPTION OF REFERENCE NUMERALS

1 Silicone rubber molded body
2 Sheet
3 Conductive ink mating portion
4 Contact portion of friction wheel
5 Abrasion tester
6 Rotating table
7a, 7b Friction wheel
8 Comb-shaped electrode
9 Contact resistance measuring portion
10 Clip lead connecting electrode

The invention claimed is:

1. A silicone rubber molded body comprising:
a conductive ink coating layer that is disposed on a portion of a surface of the silicone rubber molded body,
wherein the silicone rubber molded body is at least one molded body selected from the group consisting of a millable silicone rubber molded body and an addition curable silicone rubber molded body, and contains no linear dialkylpolysiloxane diol,
the conductive ink coating layer contains a hydrolyzable organosilicon compound,
at least one selected from the group consisting of (i) using the silicone rubber molded body with a saturated water absorption of 0.10 to 1.50% by mass and (ii) using a conductive ink containing water improves an affinity between the surface of the silicone rubber molded body and the conductive ink coating layer, and
a residual ink area is an average of 20% or more and 100% or less when a surface of the conductive ink coating layer is subjected to an abrasion test in accordance with JIS L 1096 8.19.3, C method (Taber-type method).

2. The silicone rubber molded body according to claim 1, wherein the hydrolyzable organosilicon compound is at least one selected from the group consisting of methyl silicate, ethyl silicate, propyl silicate, methyltrimethoxysilane, methyltriethoxysilane, methyltripropoxysilane, tetramethoxysilane, tetraethoxysilane, tetrapropoxysilane, vinyltrimethoxysilane, vinyltriethoxysilane, vinyltripropoxysilane, methyltris(methoxyethoxy)silane, vinyltris(methoxyethoxy)silane, methyltripropenoxysilane, vinyltripropenoxysilane, methyltriacetoxysilane, vinyltriacetoxysilane, methyltris(acetoxime)silane, vinyltris(acetoxime)silane, methyltris(methylethylketoxime)silane, and vinyltris(methylethylketoxime)silane.

3. The silicone rubber molded body according to claim 1, wherein an amount of the hydrolyzable organosilicon compound added is 5 to 30% by mass with respect to 100% by mass of ink.

4. The silicone rubber molded body according to claim 1, wherein an amount of water contained in the conductive ink is 0.1 to 3.5 mol % with respect to the hydrolyzable organosilicon compound contained in the conductive ink.

5. The silicone rubber molded body according to claim 1, wherein a residual monomer ratio of the hydrolyzable organosilicon compound of the conductive ink coating layer is 45 to 95% by the presence of water in the conductive ink, assuming that a residual monomer ratio of the hydrolyzable organosilicon compound is 100% when no water has been added to a conductive ink.

6. The silicone rubber molded body according to claim 1, wherein the silicone rubber molded body has surface tackiness, and the surface tackiness as determined by an adhesive force that is measured in accordance with JIS Z 0237 is 1.5 to 3.0 gf·s.

7. The silicone rubber molded body according to claim 1, wherein a contact resistance value of the conductive ink coating layer is 300Ω or less.

8. The silicone rubber molded body according to claim 1, wherein the silicone rubber molded body is cured with an organic peroxide.

9. A method for producing a silicone rubber molded body comprising a conductive ink coating layer that is disposed on a portion of a surface of the silicone rubber molded body,
wherein the silicone rubber molded body is at least one molded body selected from the group consisting of a millable silicone rubber molded body and an addition curable silicone rubber molded body, and contains no linear dialkylpolysiloxane diol,
the method comprising:
using a silicone rubber molded body with a saturated water absorption of 0.10 to 1.50% by mass; and
applying a conductive ink containing a hydrolyzable organosilicon compound to a portion of a surface of the silicone rubber molded body to form a conductive ink coating layer,
wherein a residual ink area is an average of 20% or more and 100% or less when a surface of the conductive ink coating layer is subjected to an abrasion test in accordance with JIS L 1096 8.19.3, C method (Taber-type method).

10. A method for producing a silicone rubber molded body comprising a conductive ink coating layer that is disposed on a portion of a surface of the silicone rubber molded body,
wherein the silicone rubber molded body is at least one molded body selected from the group consisting of a millable silicone rubber molded body and an addition curable silicone rubber molded body, and contains no linear dialkylpolysiloxane diol,
the method comprising:
applying a conductive ink containing a hydrolyzable organosilicon compound and water to a portion of a surface of the silicone rubber molded body to form a conductive ink coating layer,
wherein a residual ink area is an average of 20% or more and 100% or less when a surface of the conductive ink coating layer is subjected to an abrasion test in accordance with JIS L 1096 8.19.3, C method (Taber-type method).

11. The method according to claim 9, wherein the hydrolyzable organosilicon compound is at least one selected from the group consisting of methyl silicate, ethyl silicate, propyl silicate, methyltrimethoxysilane, methyltriethoxysilane, methyltripropoxysilane, tetramethoxysilane, tetraethoxysilane, tetrapropoxysilane, vinyltrimethoxysilane, vinyltriethoxysilane, vinyltripropoxysilane, methyltris(methoxyethoxy)silane, vinyltris(methoxyethoxy)silane, methyltripropenoxysilane, vinyltripropenoxysilane, methyltriacetoxysilane, vinyltriacetoxysilane, methyltris(acetoxime)silane, vinyltris(acetoxime)silane, methyltris(methylethylketoxime)silane, and vinyltris(methylethylketoxime)silane.

12. The method according to claim 9, wherein an amount of the hydrolyzable organosilicon compound added is 5 to 30% by mass with respect to 100% by mass of ink.

13. The method according to claim 9, wherein an amount of water contained in the conductive ink is 0.1 to 3.5 mol % with respect to the hydrolyzable organosilicon compound contained in the conductive ink.

14. The method according to claim 9, wherein a residual monomer ratio of the hydrolyzable organosilicon compound of the conductive ink coating layer is 45 to 95% by the presence of water in the conductive ink, assuming that a residual monomer ratio of the hydrolyzable organosilicon compound is 100% when no water has been added to a conductive ink.

15. The method according to claim 9, wherein the silicone rubber molded body has surface tackiness, and the surface tackiness as determined by an adhesive force that is measured in accordance with JIS Z 0237 is 1.5 to 3.0 gf·s.

16. The method according to claim 10, wherein the hydrolyzable organosilicon compound is at least one selected from the group consisting of methyl silicate, ethyl silicate, propyl silicate, methyltrimethoxysilane, methyltriethoxysilane, methyltripropoxysilane, tetramethoxysilane, tetraethoxysilane, tetrapropoxysilane, vinyltrimethoxysilane, vinyltriethoxysilane, vinyltripropoxysilane, methyltris(methoxyethoxy)silane, vinyltris(methoxyethoxy)silane, methyltripropenoxysilane, vinyltripropenoxysilane, methyltriacetoxysilane, vinyltriacetoxysilane, methyltris(acetoxime)silane, vinyltris(acetoxime)silane, methyltris(methylethylketoxime)silane, and vinyltris(methylethylketoxime)silane.

17. The method according to claim 10, wherein an amount of the hydrolyzable organosilicon compound added is 5 to 30% by mass with respect to 100% by mass of ink.

18. The method according to claim 10, wherein an amount of water contained in the conductive ink is 0.1 to 3.5 mol % with respect to the hydrolyzable organosilicon compound contained in the conductive ink.

19. The method according to claim 10, wherein a residual monomer ratio of the hydrolyzable organosilicon compound of the conductive ink coating layer is 45 to 95% by the presence of water in the conductive ink, assuming that a residual monomer ratio of the hydrolyzable organosilicon compound is 100% when no water has been added to a conductive ink.

20. The method according to claim 10, wherein the silicone rubber molded body has surface tackiness, and the surface tackiness as determined by an adhesive force that is measured in accordance with JIS Z 0237 is 1.5 to 3.0 gf·s.

* * * * *